US010711762B2

(12) United States Patent
McCanney

(10) Patent No.: US 10,711,762 B2
(45) Date of Patent: Jul. 14, 2020

(54) WIND ENERGY SYSTEMS

(71) Applicant: JMCC WING, LLC, Wilmington, DE (US)

(72) Inventor: James McCanney, Minneapolis, MN (US)

(73) Assignee: JMCC Wing, LLC, Wilmington, DE (US)

( * ) Notice: Subject to any disclaimer, the term of this patent is extended or adjusted under 35 U.S.C. 154(b) by 117 days.

(21) Appl. No.: 16/034,997

(22) Filed: Jul. 13, 2018

(65) Prior Publication Data

US 2019/0024626 A1    Jan. 24, 2019

Related U.S. Application Data

(60) Provisional application No. 62/535,049, filed on Jul. 20, 2017.

(51) Int. Cl.
*F03D 1/06* (2006.01)
*F03D 1/02* (2006.01)

(52) U.S. Cl.
CPC ........... *F03D 1/0625* (2013.01); *F03D 1/025* (2013.01); *F03D 1/0666* (2013.01); *F05B 2240/2211* (2013.01)

(58) Field of Classification Search
CPC combination set(s) only.
See application file for complete search history.

(56) References Cited

U.S. PATENT DOCUMENTS

| | | | |
|---|---|---|---|
| 8,253,268 B1* | 8/2012 | Smith | F03D 1/025 290/55 |
| 2010/0259050 A1* | 10/2010 | Meller | F03D 1/025 290/55 |
| 2012/0213636 A1* | 8/2012 | Gallant | F03D 1/0625 416/182 |
| 2013/0315732 A1* | 11/2013 | Sutz | F03D 1/025 416/9 |
| 2015/0219068 A1* | 8/2015 | Port | F03D 7/0224 290/39 |
| 2016/0186719 A1* | 6/2016 | Saavedra Pacheco | F03D 1/025 416/198 A |
| 2016/0230744 A1* | 8/2016 | Boyle | F03D 1/025 |

FOREIGN PATENT DOCUMENTS

| | | |
|---|---|---|
| CN | 1217100 | 8/2005 |
| CN | 201486761 | 5/2010 |

OTHER PUBLICATIONS

PCT International Search Report and Written Opinion issued in International Application No. PCT/US18/42006, dated Sep. 27, 2018, 14 pages.
PCT International Preliminary Report on Patentability in International Application No. PCT/US2018/042006, dated Jan. 21, 2020, 7 pages.

* cited by examiner

*Primary Examiner* — Aaron R Eastman
(74) *Attorney, Agent, or Firm* — Fish & Richardson P.C.

(57) ABSTRACT

Systems can be used to harness energy from winds. For example, this document describes scalable systems having multiple wing-like blades that can efficiently convert wind power into electricity and other types of energy.

16 Claims, 5 Drawing Sheets

WIND ENERGY SYSTEMS

CROSS-REFERENCE TO RELATED APPLICATIONS

This application claims the benefit of U.S. Provisional Application Ser. No. 62/535,049, filed Jul. 20, 2017. The disclosures of the prior application is considered part of (and is incorporated by reference in) the disclosure of this application.

BACKGROUND

1. Technical Field

This document relates to systems for harnessing energy from winds. For example, this document relates to scalable systems having multiple wing-like blades that can efficiently convert wind power into electricity and other types of energy.

2. Background Information

Alternative energy sources are fueled in ways that do not use up the earth's natural resources or otherwise harm the environment. For example, alternative energy avoids the use of fossil fuels or nuclear power. Said another way, alternative energy is power from a renewable source that is not harmful to the planet, and that does not cause the destruction of resources. Alternative energy sources are considered to be "clean," meaning that they do not produce harmful pollutants. Such harmful pollutants can include carbon dioxide, carbon monoxide, sulfur dioxide, nitrogen oxide, and others.

One exemplary type of alternative energy is wind power. Wind power is energy generated by harnessing air currents, such as by using large wind-turbines that are spun by wind to generate electricity.

SUMMARY

This document describes systems for harnessing energy from winds. For example, this document describes scalable systems having multiple wing-like blades that can efficiently convert wind power into electricity and other types of energy, and/or provide direct mechanical power for systems such as refrigeration systems.

In one aspect, this disclosure is directed to a wind energy system that includes a support structure, a hub assembly, a wing structure, and a cylindrical annular rim extending around an outer periphery of the wing structure. The hub assembly is coupled to the support structure such that the hub assembly is elevated above ground level. The wing structure is coupled to the hub assembly and defines an outer periphery. The wing structure is rotatable in relation to the support structure and includes: (i) a plurality of full-length wings extending from near the hub assembly to near the outer periphery, and (ii) a plurality of segmental wings that are radially shorter than the full-length wings. Individual ones of the segmental wings are interspersed between pairs of adjacent pairs of the full-length wings.

Such a wind energy system may optionally include one or more of the following features. An outer end of each of the segmental wings may be located near the outer periphery. Each of the full-length wings may extend along radii of a cylinder defined by the cylindrical annular rim. The wind energy system may also include a first assembly of radial members extending radially from the hub assembly and/or a second assembly of radial members extending radially from the hub assembly. The first assembly of radial members may be movable in relation to the second assembly of radial members. The first assembly of radial members may be rotatable around an axis of the hub assembly in relation to the second assembly of radial members. The wing structure may also include a plurality of single radial members. Each of the full-length wings may be attached to a respective single radial member of the plurality of single radial members.

In another aspect, this disclosure is directed to another wind energy system that includes a support structure, a hub assembly coupled to the support structure such that the hub assembly is elevated above ground level, and a wing structure coupled to the hub assembly and defining an outer periphery. The wing structure is rotatable in relation to the support structure and includes: (a) a plurality of full-length wings extending from near the hub assembly to near the outer periphery; (b) a plurality of first segmental wings that are radially shorter than the full-length wings, individual ones of the first segmental wings interspersed between pairs of adjacent full-length wings; and (c) a plurality of second segmental wings that are radially shorter than the full-length wings. Pairs of the second segmental wings are interspersed between the pairs of adjacent full-length wings.

Such a wind energy system may optionally include one or more of the following features. The plurality of second segmental wings may be positioned farther radially outward from the hub assembly in comparison to the plurality of first segmental wings. The wind energy system may also include a cylindrical annular rim extending around the outer periphery of the wing structure. Each of the full-length wings may extend along radii of a cylinder defined by the cylindrical annular rim. Each of the full-length wings, each of the first segmental wings, and each of the second segmental wings may extend along radii of the cylinder defined by the cylindrical annular rim. An outer end of each of the second segmental wings may be located near the outer periphery.

In another aspect, this disclosure is directed to another wind energy system that includes a support structure, a hub assembly coupled to the support structure such that the hub assembly is elevated above ground level, and a wing structure coupled to the hub assembly and defining an outer periphery. The wing structure is rotatable in relation to the support structure and includes: (1) a plurality of full-length wings extending from near the hub assembly to near the outer periphery and (2) a plurality of segmental wings that are radially shorter than the full-length wings. Pairs of the segmental wings are interspersed between the pairs of adjacent full-length wings.

In some embodiments, such a wind energy system also includes a cylindrical annular rim extending around the outer periphery of the wing structure.

Particular embodiments of the subject matter described in this document can be implemented to realize one or more of the following advantages. In some embodiments, the wind energy systems described herein are constructed of relatively lightweight components. Accordingly, the shipping and on-site erection processes can advantageously be simplified in comparison to conventional systems (e.g., in comparison to three-blade wind turbines). In some embodiments, the weightier components (e.g., the generator) of the wind energy systems described herein can be mounted at or near ground level to further simplify construction and future maintenance. The designs of the wind energy systems described herein are advantageously efficient in virtually all wind conditions, including low winds. Additionally, the wind energy systems described herein are scalable from small to enormous sizes to suit a wide variety of applications. Larger sized systems can advantageously include more wings (and larger wings) as compared to smaller systems, advantageously leading to much greater power generation. Moreover, the wind energy systems described herein are flexible in that they can be adapted to operate various types of systems. For example, in some implementations the wind energy system can be adapted to operate a system for generating electricity. In other example, the wind energy systems can be adapted to operate a refrigeration system. In some embodiments, the wind energy systems can be adapted to operate two or more systems concurrently, such as an electricity generator and a refrigeration system. The ratio of the distribution of the power from the wind energy system to the two or more systems can be varied in proportion to each other (e.g., 50%:50%, 80%:20%, 100%:0%, 20%:80%, 0%:100% etc.) to flexibly meet the needs of the particular situation.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described herein. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description herein. Other features, objects, and advantages of the invention will be apparent from the description and drawings, and from the claims.

DESCRIPTION OF THE DRAWINGS

Like reference numbers represent corresponding parts throughout.

DETAILED DESCRIPTION

This document describes systems for harnessing energy from winds. For example, this document describes scalable systems having multiple wing-like blades that can efficiently convert wind power into electricity and other types of energy, and/or provide direct mechanical power for systems such as refrigeration systems.

Figure 1:
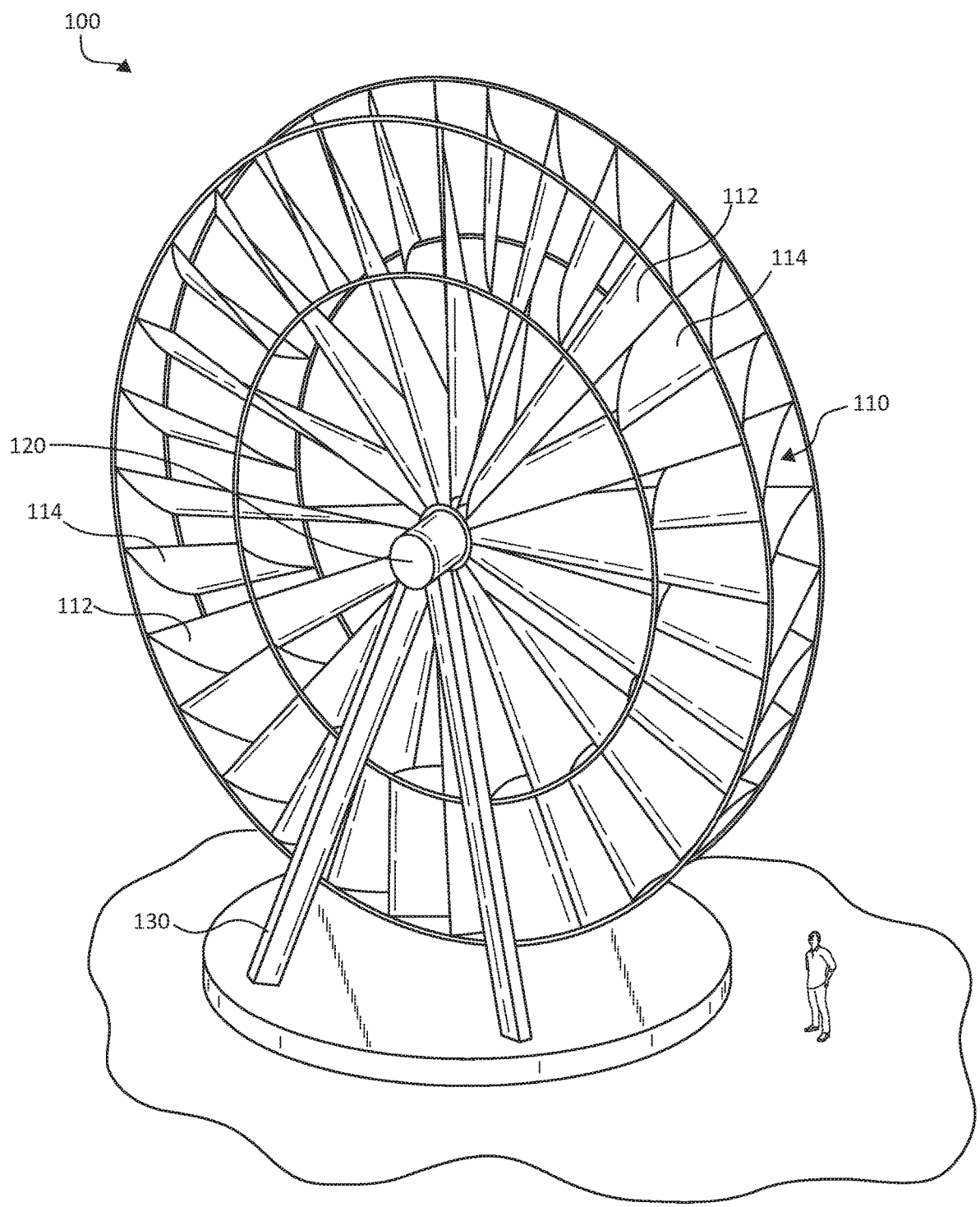
FIG. 1 is a perspective view of an example wind energy system in accordance with some embodiments provided herein.

Referring to FIG. 1, an example wind energy system 100 can be used to convert wind energy into electricity and other types of energy. Broadly speaking, wind energy system 100 includes a wing structure 110, a hub assembly 120, a support structure 130, and an energy conversion system (not visible in this view, e.g., shown in FIGS. 3-5).

Wing structure 110 is rotatably coupled relative to support structure 130 by hub assembly 120. Wind forces act on wing structure 110 to make wing structure 110 rotate. Rotations of wing structure 110 are transmitted to drive the rotation of an electrical generator, for example. In result, wind energy system 100 converts wind to electricity (or other forms of energy such as compressed air, water pressure, mechanical assists, and the like). Support structure 130 can rotate about a vertical axis to keep adjusting wing structure 110 orthogonally to the incoming wind, in the normal manner of a windmill.

Wind energy system 100 can be constructed on land (as depicted). In some cases, wind energy system 100 can be constructed offshore (e.g., mounted on one or more piers). Alternatively, wind energy system 100 can be constructed to float on the surface of water, such as on a barge. In some cases, a single wind energy system 100 is used at a particular location. In some cases, multiple wind energy systems 100 are used at the same general location (e.g., in a "wind farm" arrangement). While wind energy system 100 is described here in the context of converting wind energy to other usable types of energy, it is also imagined that wind energy system 100 can be used to convert the energy of other Newtonian fluids such as water movements (e.g., from ocean tides, rivers, currents, and the like) to usable types of energy.

In the depicted embodiment, wing structure 110 includes full-length wings 112 and shorter peripheral segmental wings 114. This arrangement of wing structure 110 presents a great amount of wing surface to the incoming wind coupled with aerodynamic lift in the radial direction, resulting in a high efficiency of wind energy conversion. Additionally, the outer periphery of wing structure 110 is where the greatest torque on hub assembly 120 can be generated. Therefore, interspersing shorter peripheral segmental wings 114 between pairs of adjacent full-length wings 112 facilitates greater torque generation as compared to not including such interspersed shorter peripheral segmental wings 114.

In the depicted embodiment, full-length wings 112 extend from near hub assembly 120 to near the outer-most periphery of wing structure 110. Peripheral segmental wings 114 are interspersed between adjacent pairs of full-length wings 112 and do not extend all the way to hub assembly 120. This structure serves to maximize the amount of wings, while allowing for sufficient spacing between the wings so that power generated by an individual wing is not detrimentally effected by adjacent wings that are too close.

In some embodiments, full-length wings 112 and/or peripheral segmental wings 114 are constructed of solid sheet materials such as, but not limited to, aluminum, galvanized steel, fiber-reinforced polymers, and the like. In some embodiments, full-length wings 112 and/or peripheral segmental wings 114 are constructed of flexible sheet materials such as, but not limited to, woven synthetic fibers, woven carbon fibers, DACRON®, nylon, polyester, polyethylene naphthalate (PEN), KEVLAR®, and the like. In some embodiments, full-length wings 112 are constructed of one of either solid or flexible materials, and peripheral segmental wings 114 are constructed of the other of either solid or flexible materials. In particular embodiments, the wings 112/114 are constructed of flexible sheet materials that are peripherally bordered by a less flexible frame made of materials such as rope, metal, plastic, and the like. In some embodiments, one or more battens are included in individual ones of the wings 112/114.

In the depicted embodiment, there are a total quantity of 16 full-length wings 112 and a total quantity of 16 peripheral segmental wings 114. It should be understood that the wing structure 110 is not limited to 16 each of full-length wings 112 and/or peripheral segmental wings 114. For example, in some embodiments the total quantity of full-length wings 112 and/or peripheral segmental wings 114 is four, five, six, seven, eight, nine, ten, eleven, twelve, fourteen, eighteen, twenty, twenty-two, twenty-four, twenty-six, twenty-eight, thirty, or more than thirty.

While in the depicted embodiment there is a single peripheral segmental wing 114 between each pair of adjacent full-length wings 112, in some embodiments there are two, three, four, or more than four peripheral segmental wings 114 between each pair of adjacent full-length wings 112.

It should be understood that wind energy system 100 is fully scalable. For example, the diameter of wing structure 110 can be made to suit the particular application and environmental conditions. In some embodiments, the diameter of wing structure 110 can range from 3 meters to 20 meters, or from 10 meters to 50 meters, or from 30 meters to 70 meters, or from 50 meters to 90 meters, or from 70 meters to 110 meters, or from 90 meters to 130 meters, or from 110 meters to 150 meters, or from 130 meters to 170 meters, or larger, without limitation.

Other design parameters of wind energy system 100 are selectable to make it best suited to aspects such as, but not limited to, local environmental conditions (e.g., average wind speed), the size of wing structure 110, and other such factors. For example, without limitation, the following design parameters can be strategically selected: the aspect ratio (length versus width) of wings 112/114, the angle(s) of wings 112/114 relative to the incoming wind, the cross-sectional shape of the wings 112/114, and the like. In some embodiments, the wings 112/114 have an airfoil shape. In some such embodiments, the airfoil shape may be "cut into" the construction of the wings 112/114. The airfoil shape can be selectively adjustable in some embodiments so as to be configured to optimize the power of the wings 112/114 in accordance with the wind conditions. In some embodiments, one or more of the wings 112/114 is triangular in shape. In some embodiments, one or more of the wings 112/114 is quadrilateral (e.g., rectangular, parallelogram, trapezoidal, etc.) in shape.

Wind energy system 100 (and the other wind energy systems described herein) can be used to provide mechanical motive power to a wide variety of types of systems (e.g., electrical generators, refrigeration systems, pumps, compressors, and the like). To facilitate that, one or more power take off (PTO) arrangements can be included in some embodiments of wind energy system 100. Accordingly, wind energy system 100 can be adapted to provide motive power to virtually any type of system. In some embodiments, direct power transmissions (e.g., without a PTO) is/are used to transmit power from wind energy system 100 to the system receiving power. In particular embodiments, a combination of one or more PTOs and one or more direct power transmissions are included as part of wind energy system 100.

In some embodiments, wind energy system 100 is adapted to provide mechanical motive power to a single system. In particular embodiments, wind energy system 100 is adapted to concurrently provide mechanical motive power to two or more systems. In some such embodiments, controls are included by which the proportion of the distribution of power from wind energy system 100 to the two or more systems can be selectively variable. For example, if two systems are being powered by wind energy system 100, the proportion of the distribution of power from wind energy system 100 can be equally split 50%:50%, or can be selectively varied anywhere between 100%:0% and 0%:100%. That is, a first system can receive 50% of the power from wind energy system 100 and a second system can receive 50% of the power. Or, the first system can receive 100% of the power and the second system can receive 0% of the power. The ratio of power distribution can be reversed, and the ratio can be set to any desired proportion between the two or more systems receiving the power from wind energy system 100.

Figure 2:
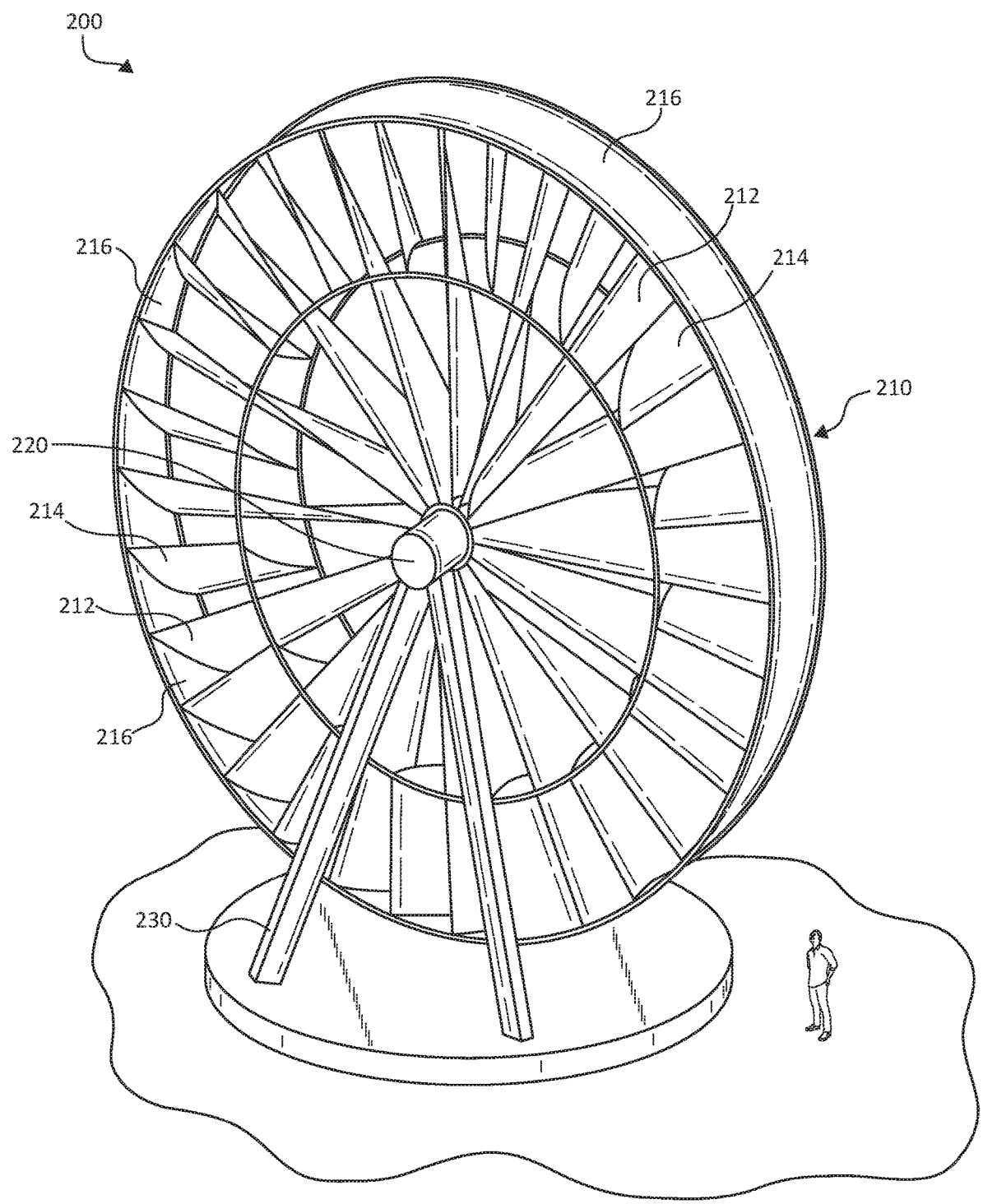
FIG. 2 is a perspective view of another example wind energy system in accordance with some embodiments provided herein.

Referring to FIG. 2, another example wind energy system 200 can be used to convert wind energy into electricity and other types of energy. Broadly speaking, wind energy system 200 includes a wing structure 210, a hub assembly 220, a support structure 230, and an energy conversion system (not visible in this view, e.g., shown in FIGS. 3-5).

Wind energy system 200 can be constructed like wind energy system 100 (as described in reference to FIG. 1), and also includes a cylindrical annular rim 216. Annular rim 216 is mounted perpendicularly to the wings of wing structure 210 around the outer periphery of the wings.

Annular rim 216 provides a number of advantages as compared to similar systems without such a features. For example, annular rim 216 mitigates air from flowing radially off the outer ends of the wings of wing structure 210. In addition, the presence of annular rim 216 helps to maintain laminar flow across the surface of the wings of wing structure 210. Still further, annular rim 216 increases pressure on the wings of wing structure 210. These features markedly increase the operating efficiency of wind energy system 200, in all types of wind conditions.

In some embodiments, annular rim 216 is constructed of solid sheet materials such as, but not limited to, aluminum, galvanized steel, fiber-reinforced polymers, and the like. In some embodiments, annular rim 216 is constructed of flexible sheet materials such as, but not limited to, woven synthetic fibers, woven carbon fibers, DACRON®, nylon, polyester, polyethylene naphthalate (PEN), KEVLAR®, and the like.

Figure 5:
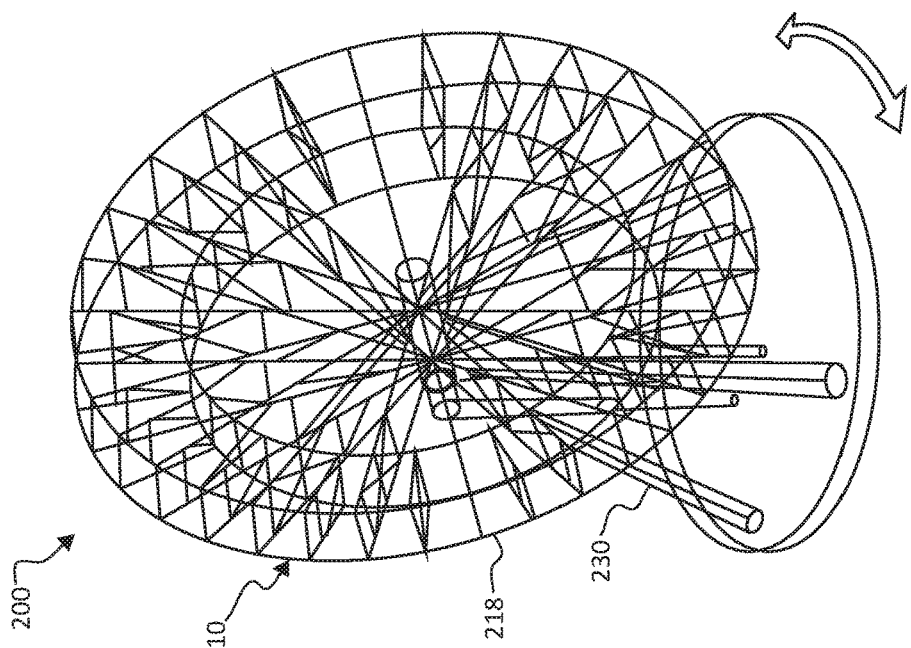
FIG. 5 is an isometric view of the structure of FIG. 4.
Figure 4:
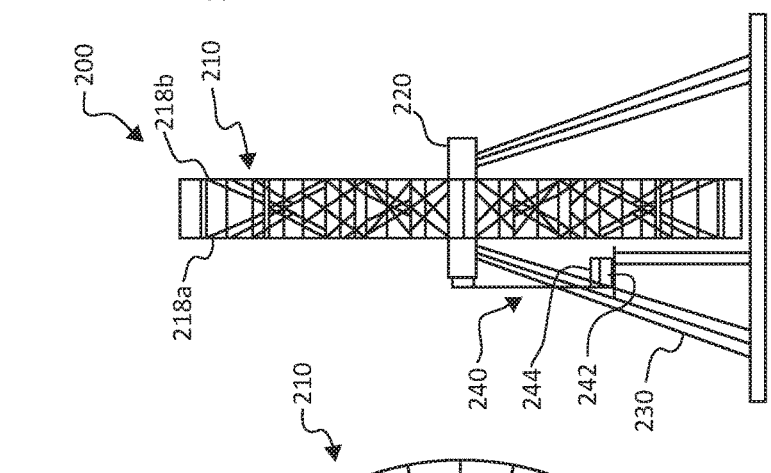
FIG. 4 is a side view of the structure of FIG. 3.
Figure 3:
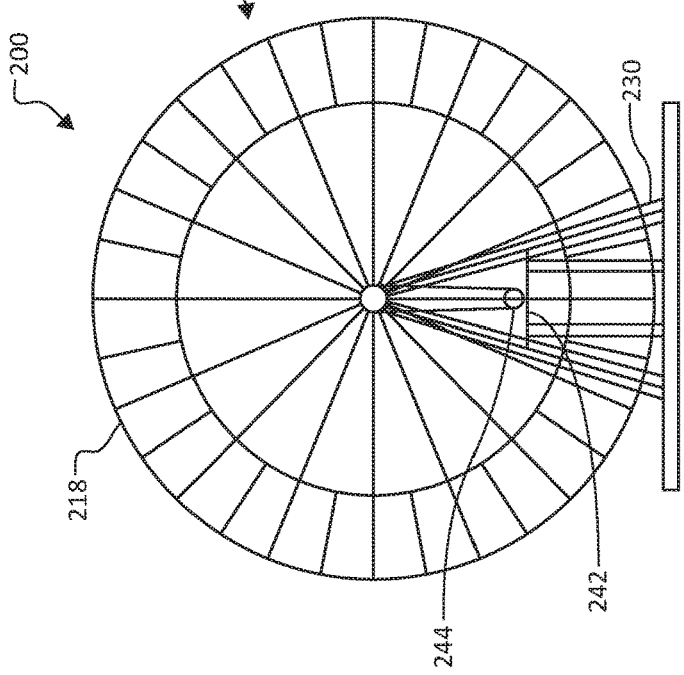
FIG. 3 is a front view showing structural details of the wind energy systems of FIGS. 1 and 2.

Referring also to FIGS. 3-5, an example is illustrated of the structure of wind energy system 200 (shown without the wings 212/214 and the annular rim 216 so as to provide greater visibility of the structure).

In the depicted embodiment, support structure 230 is a double A-frame construct. Hub assembly 220 extends between the apices of the double A-frames. In some embodiments, two vertical poles (one at each end of sub assembly 220) can be used instead of the double A-frames. In some embodiments, support structure 230 is a single vertical pole and hub assembly 220 is cantilevered from the single pole. Other support structure designs are also contemplated.

Wind-driven rotations of hub assembly 220 are transmitted to a power conversion system 240 to create electricity (and/or other types of energy such as compressed air, water pressurization, and the like). In the depicted embodiment, power conversion system 240 includes a transmission system comprising one or more belts that transmit power from hub assembly 220 to a system 244 located on a raised platform 242. Shafts, chains, pressurized fluids, PTOs, and the like, could be used instead of, or in addition to, belts. While the depicted embodiment includes the raised platform 242, in some embodiments the power conversion system is located on the ground level.

System 244 can include components such as one or more clutches, speed adjustment components (e.g., geared transmissions), and a generator, without limitation. In some implementations, the speed adjustment components are used to raise the rpm from the belt so that the generator is driven at a suitable speed. The one or more clutches can be used to limit the speed.

Wind energy system 200 (and the other wind energy systems described herein) can be used to provide mechanical motive power to a wide variety of types of systems (e.g., electrical generators, refrigeration systems, pumps, compressors, and the like). To facilitate that, one or more power take off (PTO) arrangements can be included in some embodiments of wind energy system 200. Accordingly, wind energy system 200 can be adapted to provide motive power to virtually any type of system. In some embodiments, direct power transmissions (e.g., without a PTO) is/are used to transmit power from wind energy system 200 to the system receiving power. In particular embodiments, a combination of one or more PTOs and one or more direct power transmissions are included as part of wind energy system 200.

In some embodiments, wind energy system 200 is adapted to provide mechanical motive power to a single system. In particular embodiments, wind energy system 200 is adapted to concurrently provide mechanical motive power to two or more systems. In some such embodiments, controls are included by which the proportion of the distribution of power from wind energy system 200 to the two or more systems can be selectively variable. For example, if two systems are being powered by wind energy system 200, the proportion of the distribution of power from wind energy system 200 can be equally split 50%:50%, or can be selectively varied anywhere between 200%:0% and 0%:100%. That is, a first system can receive 50% of the power from wind energy system 200 and a second system can receive 50% of the power. Or, the first system can receive 100% of the power and the second system can receive 0% of the power. The ratio of power distribution can be reversed, and the ratio can be set to any desired proportion between the two or more systems receiving the power from wind energy system 200.

An example framework 218 of wing structure 210 is illustrated in FIGS. 3-5. In some embodiments, other types of frameworks are used. In some embodiments, framework 218 of wing structure 210 can be constructed of light weight components such as carbon fiber tubes and the like. Other suitable materials (e.g., aluminum, fiberglass, etc.) can be additionally or alternatively used to construct framework 218.

In some embodiments, framework 218 of wing structure 210 is fixed in a particular configuration such that the shapes and angles of the wings 212/214 relative to the incoming wind remain generally consistent. Such an arrangement can be referred to as a "fixed wing" design.

In some embodiments, framework 218 of wing structure 210 is configured such that the shapes and angles of the wings 212/214 relative to the incoming wind are adjustable. For example, framework 218 includes a first assembly of radial members 218a (FIG. 4) and a second set of radial members 218b (FIG. 4). When the first and second assemblies of radial members 218a-b move rotationally about hub assembly 220 relative to each other, the shapes and angles of the wings 212/214 relative to the incoming wind are adjusted. This movement and functionality can be termed as an "adjustable offset" of radial members 218a-b.

In some embodiments, hub assembly 220 is split to allow for the adjustable offset capability of first and second assemblies of radial members 218a-b. That is, the portion of hub assembly 220 to which first assembly of radial members 218a is attached is movable in relation to the portion of hub assembly 220 to which second set of radial members 218b are attached. By moving the portions of hub assembly 220 relative to each other, first and second assemblies of radial members 218a-b are correspondingly moved relative to each other, and the shapes and angles of the wings 212/214 relative to the incoming wind are adjusted. Such an arrangement can be referred to as a "modified fixed wing" design.

In another embodiment, a single radial member is included (rather than having first and second assemblies of radial members 218a-b as shown). Such a single radial member can extend longitudinally along the centerline of the wings. By rotating the single radial member about its longitudinal axis, the angle of wings 212/214 relative to the incoming wind are adjusted. In some cases, one or more of the single radial members are adjusted differently than one or more others of the single radial members. For example, the wings near the vertical top of wind energy system 200 can be set at a particular angle while the wings near the vertical bottom of the wind energy system 200 are set at a different angle. Such local adjustability of the wing angle allows for optimization of different local portions of wing structure 210 in accordance with differing wind conditions that may exist at the different local portions of wing structure 210.

In some embodiments that include such single radial members to which wings 212/214 are attached, the single radial members can be segmentally-adjustable such that different wing angles can be created at differing locations along the longitudinal length of the single radial members. Moreover, in some embodiments the shape of wings 212/214 (e.g., the amount of airfoil) can be adjustable either along the entire length of wings 212/214 or at localized portions of wings 212/214 (e.g., a first portion of a particular wing can have a first shape and one or more other portions of the same wing can have a different shape). Such an arrangement can be referred to as a "variable flexible wing" design.

Figure 6:
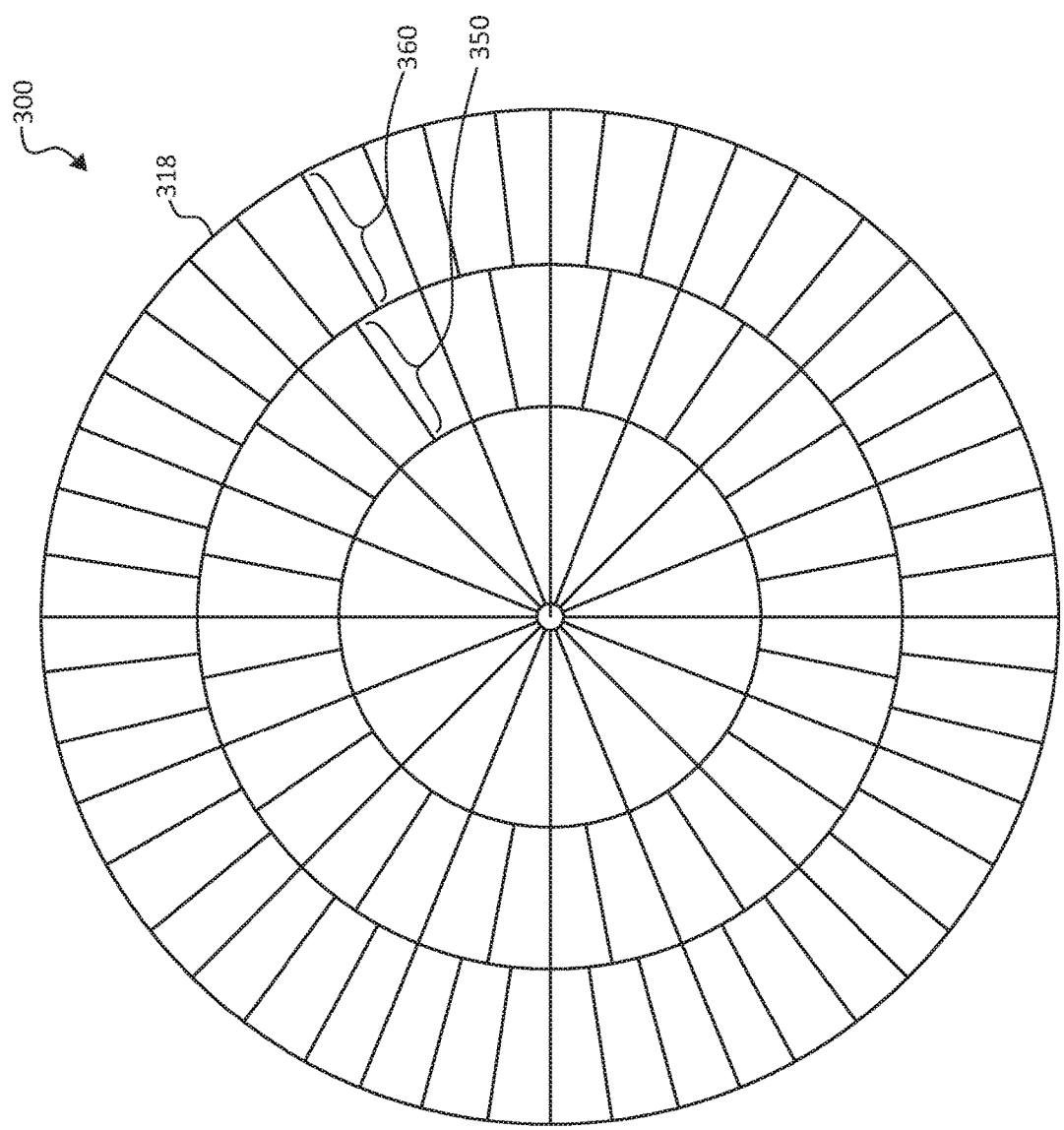
FIG. 6 is a front view that schematically shows the structure of another example wind energy system.

FIG. 6 schematically shows the structure of another example wind energy system 300. As the wind energy systems are scaled to larger sizes (e.g., larger than the systems 100 and 200), the opportunity arises to add more wings to capture more wind power. Accordingly, wind energy system 300 includes an example framework 318 of a wing structure that supports full-length wings and two annular tranches of shorter segmental wings interspersed between the full-length wings.

In the depicted embodiment, framework 318 is constructed such that a first annular tranche of segmental wings 350 includes a single segmental wing between each pair of adjacent full-length wings. A second annular tranche of segmental wings 360 includes two segmental wings between each full-length pair of adjacent full-length wings. In some embodiments, three, four, five, six or more segmental wings can be positioned between each full-length pair of adjacent full-length wings.

Second annular tranche of segmental wings 360 is located radially outward from first annular tranche of segmental wings 350, where the spacing between adjacent pairs of full-length wings is greater (as compared to the spacing between adjacent pairs of full-length wings at first annular tranche of segmental wings 350). This wing structure of framework 318 presents a great amount of wing surface to the incoming wind, resulting in a high efficiency of wind energy conversion. While the depicted embodiment includes two annular tranches of segmental wings, in some embodiments three, four, five, six, seven, eight, or more than eight annular tranches of segmental wings are included.

Figure 7:
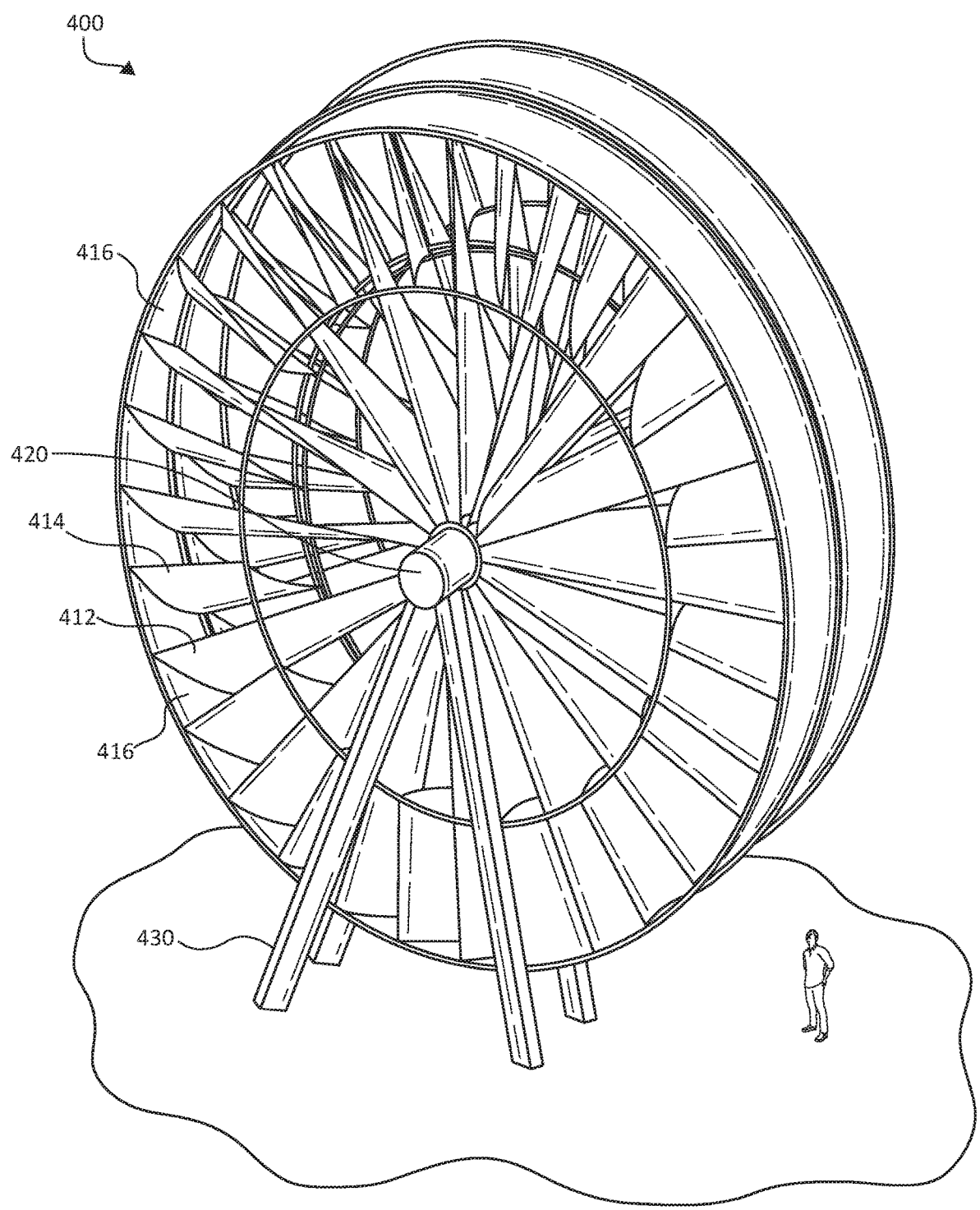
FIG. 7 is another perspective view of another example wind energy system in accordance with some embodiments provided herein.

As FIG. 7 depicts, two or more of any of the wind energy systems described herein can be arranged together (or "ganged" together) in series to create a multiplexed wind energy system 400. In the depicted embodiment, the multiplexed wind energy system 400 includes a single hub assembly 420, and a single support structure 430. For example, as depicted, the two or more wind energy systems can each be mounted to the hub assembly 420 and be supported by the support structure 430. In some cases, the multiplexed wind energy system 400 can output a greater amount of power generation from the same amount of incoming wind, as compared to a single wind energy system.

In some embodiments, each of the two or more wind energy systems that are arranged in series to create the multiplexed wind energy system 400 are of the same size and configuration. Alternatively, in some embodiments the two or more wind energy systems that are arranged in series to create the multiplexed wind energy system 400 are of differing sizes and/or configurations. For example, without limitation, in some embodiments the leeward wind energy system is of a greater diameter than the windward wind energy system.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. For example, the modified fixed wing design and the variable flexible wing design can be implemented in the embodiment depicted in FIG. 6. Moreover, the embodiment depicted in FIG. 6 can include a cylindrical annular rim extending around the outer periphery of the wing structure.

Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A wind energy system, comprising:
   a support structure;
   a hub assembly rotatable in relation to the support structure about an axis of the hub assembly;
   a wing structure coupled to the hub assembly and defining an outer periphery, the wing structure rotatable in relation to the support structure and comprising:
      a plurality of full-length wings extending between the hub assembly and the outer periphery; and
      a plurality of segmental wings that are radially shorter than the full-length wings, individual ones of the segmental wings interspersed between adjacent pairs of the full-length wings;
   a cylindrical annular rim extending around the outer periphery of the wing structure;
   a first set of radial members extending from the hub assembly to the cylindrical annular rim; and
   a second set of radial members extending from the hub assembly to the cylindrical annular rim, the second set of radial members being spaced apart from the first set of radial members along the axis of the hub assembly to define a space in which the wing structure is positioned.

2. The wind energy system of claim 1, wherein an outer end of each of the segmental wings is located at the outer periphery.

3. The wind energy system of claim 1, wherein each of the full-length wings extends along radii of a cylinder defined by the cylindrical annular rim.

4. The wind energy system of claim 1, wherein the first set of radial members is movable in relation to the second set of radial members.

5. The wind energy system of claim 4, wherein the first set of radial members is rotatable about the axis of the hub assembly in relation to the second set of radial members to adjust angles of the full-length wings relative to incoming wind.

6. The wind energy system of claim 1, wherein the wing structure is a first wing structure and the cylindrical annular rim is a first cylindrical annular rim, and wherein the wind energy system further comprises:
   a second wing structure coupled to the hub assembly adjacent to the first wing structure and defining an outer periphery; and
   a second cylindrical annular rim extending around the outer periphery of the second wing structure.

7. The wind energy system of claim 6, wherein the second wing structure comprises full-length and segmental wings that are configured like the first wing structure.

8. The wind energy system of claim 6, wherein the second wing structure is configured differently than the first wing structure.

9. A wind energy system, comprising:
   a support structure;
   a hub assembly rotatable in relation to the support structure about an axis of the hub assembly; and
   a wing structure coupled to the hub assembly and defining an outer periphery, the wing structure rotatable in relation to the support structure and comprising:
      a plurality of full-length wings extending between the hub assembly and the outer periphery;
      a plurality of first segmental wings that are radially shorter than the full-length wings, individual ones of the first segmental wings interspersed between pairs of adjacent full-length wings;

a plurality of second segmental wings that are radially shorter than the full-length wings, pairs of the second segmental wings interspersed between the pairs of adjacent full-length wings;

a first set of radial members extending from the hub assembly to the outer periphery; and a second set of radial members extending from the hub assembly to the outer periphery, the second set of radial members being spaced apart from the first set of radial members along the axis of the hub assembly to define a space in which the wing structure is positioned.

10. The wind energy system of claim 9, wherein the plurality of second segmental wings are positioned farther radially outward from the hub assembly in comparison to the plurality of first segmental wings.

11. The wind energy system of claim 9, further comprising a cylindrical annular rim extending around the outer periphery of the wing structure.

12. The wind energy system of claim 11, wherein each of the full-length wings extends along radii of a cylinder defined by the cylindrical annular rim.

13. The wind energy system of claim 11, wherein each of the full-length wings, each of the first segmental wings, and each of the second segmental wings extend along radii of the cylinder defined by the cylindrical annular rim.

14. The wind energy system of claim 9, wherein an outer end of each of the second segmental wings is located at the outer periphery.

15. A wind energy system, comprising:
a support structure;
a hub assembly rotatable in relation to the support structure about an axis of the hub assembly; and
a wing structure coupled to the hub assembly and defining an outer periphery, the wing structure rotatable in relation to the support structure and comprising:
a plurality of full-length wings extending between the hub assembly and the outer periphery;
a plurality of segmental wings that are radially shorter than the full-length wings, pairs of the segmental wings interspersed between the pairs of adjacent full-length wings;
a first set of radial members extending from the hub assembly to the outer periphery; and
a second set of radial members extending from the hub assembly to the outer periphery, the second set of radial members being spaced apart from the first set of radial members along the axis of the hub assembly to define a space in which the wing structure is positioned.

16. The wind energy system of claim 15, further comprising a cylindrical annular rim extending around the outer periphery of the wing structure.

* * * * *